United States Patent [19]

Walker et al.

[11] Patent Number: 5,491,192

[45] Date of Patent: Feb. 13, 1996

[54] NON-AQUEOUS DISPERSION FOR ALKYD FORMULATION

[75] Inventors: Frederick H. Walker, Hatfield; Chao-Jen Chung, Gwynedd; Andrew Mercurio, Gwynedd Valley, all of Pa.

[73] Assignee: Rohm and Haas Company, Philadelphia, Pa.

[21] Appl. No.: 754,262

[22] Filed: Aug. 28, 1991

Related U.S. Application Data

[60] Continuation of Ser. No. 407,676, Sep. 11, 1989, abandoned, which is a division of Ser. No. 368,104, Jun. 19, 1989, abandoned, which is a continuation of Ser. No. 104,624, Oct. 2, 1987, abandoned.

[51] Int. Cl.$^6$ ..................... C08L 67/08
[52] U.S. Cl. ............... 525/7.4; 525/64; 525/80; 525/92 F; 525/94; 525/166; 525/167.5; 525/218; 525/221; 525/228; 525/230
[58] Field of Search ............... 525/7.4, 64, 80, 525/92, 94, 166, 167.5, 218, 228, 230, 308, 221

[56] References Cited

U.S. PATENT DOCUMENTS

| | | | |
|---|---|---|---|
| 3,607,821 | 9/1971 | Clarke et al. | 260/34.2 |
| 4,133,785 | 1/1979 | Henshaw et al. | 260/22 |
| 4,199,487 | 4/1980 | Nakayame et al. | 260/23 |

FOREIGN PATENT DOCUMENTS

| | | | |
|---|---|---|---|
| 57-33363 | 9/1983 | Japan | 67/8 |
| 57-95399 | 12/1983 | Japan | 3/66 |
| 58-74013 | 11/1984 | Japan | 5/00 |

OTHER PUBLICATIONS

Oil and Colur Chemist's Assoc., Surface Coatings 2nd ed., Chapman & Hall Ltd., N.Y. (1983) pp. 105–113.
Progress In Organic Coatings 14, Synthesis of Air Drying Microgels, Nakayama, (1986) pp. 103–113.
Encyclopedia of Polymer Science and Technology, 1st ed., John Wiley & Sons, Inc., (1964) R. G. Mraz & R. P. Silver, Alkyd Resin p. 687.
Polymer Handbook Chap. IV, pp. 337–359; J. Brandrup & J. H. Immergut eds. John Wiley & Sons, N.Y. (1975).
Dispersion Polymerization In Organic Media; K. E. J. Barrett, ed., John Wiley & Sons, N.Y. (1975) Chaps. 3–4.
Polymer Handbook, J. Brandup & I. H. Immergut eds. Chap. III, W. A. Lee & R. A. Rutherford, pp. 139–192.
Martens, *Alkyd Resins* pp. 1–2 Reinhold Publishing Corp NY 1961.
*The Condensed Chemical Dictionary* pp. 40–41 Reinhold Publishing Corp. NY 6th ed. 1961.

*Primary Examiner*—Patricia A. Short
*Attorney, Agent, or Firm*—Ronald D. Bakule

[57] ABSTRACT

A non-aqueous dispersion for modifying alkyd-containing coating formulations and a method for manufacturing the non-aqueous dispersion are provided. The non-aqueous dispersion contains from about 10 to about 60 parts by weight of a low molecular weight solution polymer, having a selected glass transition temperature greater than about −10° C., and from about 90 to about 40 parts by weight of a polymer which is insoluble in the non-aqueous medium, and where the soluble polymer is attached to or adsorbed onto the insoluble polymer particles. The non-aqueous dispersion is preferably prepared by dispersion polymerization to form the insoluble polymer in a non-aqueous medium in the presence of the soluble polymer.

5 Claims, No Drawings

NON-AQUEOUS DISPERSION FOR ALKYD FORMULATION

This application is a continuation of application Ser. No. 407,676, filed Sep. 11, 1989, now abandoned, which is a division of application Ser. No. 368,104, filed Jun. 19, 1989, now abandoned, which is a continuation application of application Ser. No. 104,624 filed Oct. 2, 1987, now abandoned.

BACKGROUND OF THE INVENTION

This invention relates to a non-aqueous polymeric dispersion for modifying alkyd-containing coating formulations and to a method for making the non-aqueous dispersion. More particularly, the invention relates to a non-aqueous dispersion formed from a first alkyl-free polymer which is soluble in the non-aqueous medium, has a selected low molecular weight, a glass transition temperature greater than about −10° C., and which is attached to or adsorbed onto a second alkyl-free polymer which is insoluble in the non-aqueous dispersion. The addition of the non-aqueous dispersion to an alkyl-containing coating formulation reduces the time needed for the coating to dry without significant adverse effect on the volatile organic content and application viscosity of the formulation or the physical properties of the coating.

As a result of increasing concern over environmental pollution and to comply with government regulations, the coating industry desires to reduce the volatile organic content (hereinafter referred to as "VOC") of coating formulations. Alkyd resin-containing coatings, particularly those which dry in air at ambient temperatures, are a major contributor of volatile organic solvents.

DESCRIPTION OF THE PRIOR ART

Manufacturers of alkyd resins and coating formulators have attempted to modify alkyd-containing coating formulations to meet VOC requirements. One approach has been to reduce the molecular weight of the alkyd resin. Reducing the alkyd molecular weight has the effect of increasing the portion of non-volatile material in the formulation, thereby reducing VOC, without significantly increasing the formulation or application viscosity. As used herein "formulation or application viscosity" shall refer to the viscosity of the formulation under actual coating application conditions. For an alkyd containing formulation to be applied as a coating, as by spraying, the application viscosity of the formulation under high shear conditions should be about 300 centipoises or less. Since alkyd resins which dry in air rely on a crosslinking reaction in the coating to build the necessary molecular weight to achieve the desired coating properties, lowering the molecular weight of the alkyd dramatically and disadvantageously increases the time needed for the coating to dry. This is a particular disadvantage when increased drying times reduce productivity, as for example when the coating is to be applied in a factory.

Another approach which has been used, has been to chemically modify the alkyd resin itself to provide it with a functionality which makes it soluble or dispersible in a medium consisting largely of water. (See Oil and Colour Chemist's Association, *Surface Coatings,* Second Ed., Chapman and Hall Ltd., New York (1983) pages 208–256). These water-reducible alkyd-containing coatings fail, in many applications, however, to meet the performance characteristics of the original solvent-based alkyd formulation. Poor water resistance, and long drying times under high humidity conditions are two of the typical deficiencies of such water reducible alkyd-containing coatings. In addition, they are difficult to formulate and somewhat costly.

Another approach has been to add a small amount of an alkyd-modified polymer consisting largely of microgel to a low molecular weight polymer. The microgel affects drying time by acting as an efficient crosslinker. (See U.S. Pat. No. 4,199,487 and Progress in Organic Coatings, 14 (1986) *Synthesis of Air Drying Microgels,* Nakayama, pages 103–113).

One approach which addresses the drying time problem has been to blend solution polymers dissolved in non-aqueous solvents with alkyd resin-containing coating formulations (See Encyclopedia of Polymer Science and Technology, First Edition, John Wiley and Sons, Inc. (1964) R. G. Mraz and R. P. Silver, Alkyd Resins page 687). One such type of solution polymers is acrylic polymers which are added to alkyd resin formulations. If the solution polymer has a low molecular weight, less than about 10,000 Mn, the resulting coatings have been found to be unacceptably brittle. If the solution polymer has a higher molecular weight, the volatile organic solvent content of the formulation must be increased so as to achieve an acceptable application viscosity. Therefore, blending solution polymers with alkyd resin formulations has not been a universally accepted solution to the problems of VOC and drying time.

Japanese patent application publication Nos. 58-149943 and 58-213059 disclose a method for preparing non-aqueous dispersions by polymerizing vinyl monomers with drying oil alkyd resins and the use of such dispersions in alkyd-containing paints. This method is not universally useful for any alkyd-containing formulation since the alkyd which is used to stabilize the non-aqueous dispersion must closely match the oil length of the alkyd in the coating (58-213059) or the alkyd to be modified by the non-aqueous dispersion must have specific oil length (58-149943). In addition, we have found that this approach is not very efficient in reducing drying time (See comparative example).

U.S. Pat. No. 4,133,785 is directed to an air drying alkyd coating formulation formed by copolymerizing, in the presence of a non-peroxide or non-hydroperoxide initiator, at least two copolymerizable alpha, beta ethylenically unsaturated monomers, which must include at least 10–19 percent acrylonitrile, with a modified alkyd resin in a hydrocarbon liquid. The modified alkyd contains 1 to 4 wt % itaconic acid. The itaconic acid provides the site on the alkyd for attachment by the polymer. Following the copolymerization, a second hydrocarbon liquid is added to form a dispersion and the dispersion is cooled until a dispersion having polymer particles of 2 microns or less are formed. No teaching or suggestion is provided, however, concerning the use of such a dispersion to modify alkyd-containing coating formulations. Also, see Japanese patent application publication No. 59-199777 which describes modifying a non-aqueous dispersion's coating properties by the addition of an alkyd resin.

Accordingly, although a number of approaches including the use of solution polymers and non-aqueous dispersions have been generally disclosed for modifying alkyd-containing coating formulations, a need still exists for a simple and effective solution for reducing the drying time of alkyd formulations without adversely affecting the VOC, coating properties or formulation viscosity.

It is, therefore, an object of the present invention to provide an effective modifier for alkyd-containing coating formulations which is easy to prepare and use and which provides desired formulation and coating properties.

SUMMARY OF THE INVENTION

We have discovered a method for producing a high solids, non-aqueous, alkyd-free polymeric dispersion containing from about 10 to about 60 parts weight of a low molecular weight, high glass transition temperature solution polymer attached to or adsorbed onto from about 90 to about 40 parts by weight of an insoluble polymer such that admixing the alkyd-free polymeric dispersion with an alkyd-containing coating formulation reduces the drying time of the alkyd-coating.

In addition, we have found a dispersion polymerization process useful for preparing the non-aqueous dispersion comprising dispersion polymerizing organic solvent soluble monomers to form the insoluble polymer component of the non-aqueous dispersion in the presence of the soluble low molecular weight, high Tg, solution polymer.

DETAILED DESCRIPTION OF THE INVENTION

The non-aqueous dispersion of the invention contains two polymeric components; a low molecular weight, high Tg solution polymer and a polymer which is insoluble in the selected non-aqueous medium. Both the solution polymer and insoluble polymer are alkyd-free.

The Soluble Polymer

There are four basic criteria for selecting a soluble polymer useful in the practice of the invention. The soluble polymer must:

1. have a number average molecular weight (Mn) in the range of from about 2000 to about 40,000;

2. be soluble in the non-aqueous medium selected for the preparation of the non-aqueous dispersion;

3. have a calculated glass transition temperature (Tgc) greater than about −10° C.; and 4. be capable of being chemically attached to or physically adsorbed onto the insoluble polymer particles.

We have found that the Mn of the soluble polymer should be in the range of from about 2000 up to about 40,000. Soluble polymers meeting the three other requirements, but having a Mn below about 1,500 are undesirable in the practice of the invention because they impart instability to the final non-aqueous dispersion resulting in excessive grit formation on preparation or particle agglomeration in the non-aqueous aqueous dispersion or alkyd-containing coating formulation. Soluble polymers which are otherwise acceptable, but which have a Mn above about 40,000 produce other undesirable effects in the final non-aqueous dispersion. These high molecular weight soluble polymers increase the application viscosity of the non-aqueous dispersion above generally useful application viscosities and thereby necessitate dilution of the final formulation by the addition of organic solvent with the accompanying undesirable increase in VOC.

The preferred Mn range for the soluble polymer is from about 2,000 to about 15,000.

A wide variety of liquids have been utilized as media for preparing the non-aqueous dispersion and accordingly a large number of monomers exist for preparing solution polymers soluble therein. Typically non-aqueous dispersion media have utilized relatively non-polar liquids consisting of organic liquids, such as for example; aliphatic, alicyclic, and aromatic hydrocarbons or mixtures thereof. When employing such liquids as the major portion of the non-aqueous media, one must select a monomer or monomer mixture which will form a polymer that is soluble in the selected media. In order to accomplish such a selection the solubility parameters are useful to provide guidance. The solubility parameter of the soluble polymer must be close to the solubility parameter of the non-aqueous media. By so matching the solubility parameters of the polymer and media, suitable monomers and monomer mixtures may be selected for preparing a suitable soluble polymer for use with the selected non-aqueous media. These solubility parameters may be found in *Polymer Handbook* Chapter IV pp. 337 to 359; J. Brandrup and J. H. Immergut eds., John Wiley and Sons, New York 1975 and K. E. J. Barrett, ed., *Dispersion Polymerization In Organic Media,* John Wiley and Sons, N.Y. 1975 Chapters 3 and 4. The solubility of the polymer composition in the selected non-aqueous media can be confirmed by actual experimental tests well within the skill of an ordinary chemist.

The soluble polymer must also possess a calculated glass transition temperature (Tgc) greater than about −10° C. The glass transition temperature of the soluble polymer, for the purpose of this invention, is calculated by using the Fox equation:

$$1/Tg \ polymer = W_a/Tg_a + W_b/Tg_b + etc.$$

where $W_a$, $W_b$, etc., are the weight fraction of each monomer used to make the soluble polymer, and $Tg_a$, $Tg_b$, etc. are the Tg's of a homopolymer formed from that monomer. Glass transition temperatures of polymers may be found in textbooks, such as the *Polymer Handbook,* J. Brandrup and I. H. Immergut eds. Chapter III, W. A. Lee and R. A. Rutherford pg. 139–192. We have found that the higher the Tgc of the soluble polymer the greater the drying time improvement provided by the non-aqueous dispersion containing that soluble polymer component. It should be noted, however, that as the Tgc of the soluble polymer increases and the drying time of the coating decreases, the embrittlement of the final coating increases. Accordingly, the ratio of soluble polymer to insoluble polymer, the particular soluble polymer composition and the amount of non-aqueous dispersion containing the soluble polymer added to the alkyd-formulation should be selected to provide a balance between reduced drying time and coating flexibility. We have found that while the Tgc of the solution polymer must be greater than −10° C., it is preferred to utilize a solution polymer having a Tgc greater than about 25° C. and most preferably greater than about 45° C. We have found that soluble polymers of this invention having Tgc up to about 150° C. still offer a desirable balance of drying time and coating flexibility for certain applications.

Accordingly, the monomer or monomer mixture selected for preparing the soluble polymer must produce a polymer which is soluble in the non-aqueous medium selected, have a low molecular weight (Mn) and a high Tgc.

We have found that particularly useful monomers which meet these requirements include styrene, styrene isomers such as para-, meta-, ortho- and alpha-methyl styrene, t-butyl styrene, and the high Tg non-polar esters of (meth) acrylic acid such as for example isobutyl methacrylate, 2-ethylhexyl methacrylate, isobornyl acrylate, isobornyl methacrylate, and vinyl monomers such as for example vinyl chloride. Low Tg monomers, such as for example; high alkyl ($C_4$ or greater) esters of (meth)acrylic acids may be utilized in a monomer mixture provided they are present at a concentration which does not adversely affect the overall solubility or Tgc of the solution polymer.

The soluble polymer may also contain small amounts, such as, for example less than about 10 weight percent, of monomers containing polar groups. These monomers containing polar groups are useful to increase the compatibility of the soluble polymer with the alkyd resin, provided that their use does not adversely affect the solubility or overall Tgc of the polymer in the non aqueous medium. Examples of such monomers include acrylic acid, methacrylic acid, t-butyl aminoethyl(meth)acrylate, dimethylamino ethyl-(meth)acrylate, dimethyaminopropyl (meth)acrylate, hydroxy ethyl(meth)acrylate, hydroxypropyl (meth)acrylate and dimethylaminopropyl (meth)acrylamide.

It is also permissible to include small amounts, of other copolymerizable monomers provided, however, that all the basic requirements of the resulting soluble polymer are met. Such suitable monomers include methyl methacrylate, ethyl acrylate, vinyl acetate and the like. These monomers may be utilized for economic reasons or to modify specific film properties.

The fourth requirement of the soluble polymer is that it must be designed so as to be capable of being chemically attached to or physically adsorbed onto the insoluble polymer particles. "Attachment" as used hereinafter refers to either a chemical attachment or physical adsorption phenomena. Providing functionality to the soluble polymer for attachment onto the insoluble polymer particle is well understood by those in the field of non-aqueous dispersions. (See Barrett Chapter 3 and 4) In the case where it is desired to have the soluble polymer adsorb onto the insoluble polymer particle, the soluble polymer should be modified such that it contains an insoluble segment which will adsorb onto the insoluble polymer. These types of modified soluble polymers can have insoluble segments grafted onto the soluble polymer, or be block copolymers containing the soluble polymer and insoluble polymer segment. Such polymers are not as preferred as those containing chemical attachment functionalities because the types of alkyds with which they can be formulated is limited since some of the strong solvents in which some alkyds are supplied will tend to solublize the insoluble portion of such soluble polymers rendering the polymer non-adsorptive on the insoluble polymer particles.

Chemical attachment of the soluble polymer to the insoluble polymer particle may be accomplished in a number of ways. Some monomers selected for preparing the soluble polymer have abstractable hydrogens, which provide sites for attachment to the insoluble polymer particle. Examples of such monomers include 2 ethylhexy(meth)acrylate and isobutyl(meth)acrylate. If more efficient attachment is desired, a monomer which contains two unsaturated sites of different reactivity may be used. When such monomers are used to prepare the soluble polymer some unsaturation will remain in the soluble polymer. Examples of such monomers include allyl, crotyl, dicyclopentadienyl, and dicyclopentadienyloxyethyl (meth)acrylate.

Another method for chemically attaching the soluble polymer to the insoluble polymer particles is to include in the monomer mixture for the soluble polymer a functional group which can react with the insoluble polymer. Likewise, the insoluble polymer particles may be prepared using such a functional monomer which can react with the soluble polymer. Furthermore, a multifunctional crosslinking material may be employed for attachment to both soluble and insoluble polymers. Examples of functional monomers which can be used for attaching the soluble polymer to the insoluble polymer particles include glycidyl methacrylate when methacrylic acid is used in the monomer mixture for the soluble polymer. Other complimentary monomers are well known and are described in U.S. Pat. No. 3,607,821 and in Barrett. The concentration of functional monomer or monomers is dependent upon the molecular weight of the soluble polymer, the polymerization conditions, relative grafting efficiencies, the composition of the insoluble polymer particle and the choice of nonaqueous media. The illustrative examples which follow provide a range of conditions which can be employed in the practice of the invention when allylmethacrylate or crotyl methacrylate are employed as the functional monomer.

The soluble polymer may be prepared by well known standard free radical solution polymerization techniques such as by a single step process or by a gradual addition process. It is generally preferable to utilize a gradual addition polymerization process to reduce the risk of exotherms and to provide a more uniform polymerization. Typical free radical initiators such as the azo, peroxy, hydroperoxy, peroxy ester, and diacylperoxy initiators may be used. The Mn of the soluble polymer may be controlled by the amount of initiator used as well as by the use of a chain transfer agent. Any conventional chain transfer agent may be employed, but mercaptan chain transfer agents having high chain transfer efficiency, such as for example n-octylmercaptan, are preferred for preparing low molecular weight soluble polymers.

The Insoluble Polymer

The insoluble polymer of the non-aqueous dispersion of the invention may be formed from a large number of monomer and monomer mixtures provided that the monomers used are substantially soluble in the dispersion polymerization medium employed but the resulting polymer is insoluble in the dispersion polymerization medium employed. The resulting non-aqueous dispersion must not be substantially swollen or dissolved when formulated with the solvent vehicles used with the alkyd resin coating formulation such that the resulting solids of the final formulation becomes significantly lower than it would be in the absence of the non aqueous dispersion. It is preferable that the insoluble polymer particles be prepared from a majority (50 percent by weight or more) of one or more monomers which will result in an insoluble polymer having a substantially different solubility parameter than the non-aqueous medium used for the non-aqueous dispersion or dispersion polymerization medium. Examples of suitable monomers include acrylonitrile and methacrylonitrile, vinylacetate, vinyl chloride, vinylidene chloride and derivatives of unsaturated acids such as, for example, iraconic, fumaric and maleic acid, as well as acrylic and methacrylic acid and their lower alcohol ($C_1$–$C_4$) esters, the monoesters obtained from various glycols such as ethylene glycol and propylene glycol, and acrylamide, methacrylamide and their derivatives. Any monomer or monomer mixture used to prepare the insoluble polymer by the preferred dispersion polymerization process is subject to its ability to be dispersion polymerized to a useful degree.

The monomer or monomer mixture selected for preparing the insoluble polymer will also depend upon the solvent or solvents utilized with the alkyd resin in the alkyd-containing coating formulation to be modified by the non-aqueous dispersion. Some alkyds, such as for example the long oil alkyds, are typically supplied in relatively weak solvents such as mineral spirits. In such a case the insoluble polymer of the nonaqueous dispersion may be formed from a major amount of the less polar monomers, such as for example; ethyl acrylate, methyl methacrylate or mixtures thereof. For alkyds supplied in strong solvents such as for example aromatic hydrocarbons, esters, ketones and the like, the insoluble polymer should be preferably prepared by employing the more polar monomers which result in highly insoluble polymers, such as for example, acrylonitrile and methacrylonitrile. An alternative or additive approach to insure that the insoluble polymer is not appreciably swollen or rendered soluble by such solvents, is to react the insoluble polymer such as by a crosslinking reaction. This can be accomplished during the preferred dispersion polymerization reaction used to prepare the insoluble polymer in situ by the use of bi-functional or multi-functional acrylates and methacrylates, such as for example ethylene glycol dimethacrylate, divinyl benzene, or monomers containing at least two unsaturated sites such as allyl methacrylate. Typically the concentration of such reactive or crosslinking monomers for the insoluble polymer particles is on the order of less than about 1 weight percent based on insoluble polymer solids. Significantly increased levels of reactive or crosslinking monomer are to be avoided to prevent instability of the resulting non-aqueous dispersion.

An alternate method for crosslinking the insoluble polymer is to employ a monomer having a functional group which can subsequently be crosslinked with a complimentary difunctional reagent or to employ two monomers with complimentary functional groups which can be subsequently crosslinked. For example a hydroxyethyl methacrylate copolymer can be crosslinked with a difunctional isocyanate or a glycidyl methacrylate copolymer can be reacted with a diamine. Other suitable methods and reagents useful for such crosslinking which are well known in the art may also be employed.

The medium utilized for the preferred dispersion polymerization of the insoluble polymer contains a major (greater than about 50% by weight) amount of an aliphatic hydrocarbon liquid, an aromatic hydrocarbon liquid or mixtures thereof and may be the same or different from the medium used to prepare the soluble polymer. If an aromatic hydrocarbon liquid is selected as the major component of the non-aqueous medium then it is preferred to use the more polar monomer or mixtures, such as those containing acrylonitrile, or to employ the above described in-situ crosslinking procedures to obtain the desired insolubility and to maintain particle size control and useful application viscosity for the resulting non-aqueous dispersion.

The insoluble polymers are preferably prepared by a standard non-aqueous dispersion polymerization reaction. While a 'single shot' process may be employed, it is preferable to use a gradual addition polymerization which optionally includes a portion or all of the soluble polymer in the initial charge along with a portion of the monomer mixture for the insoluble polymer in the non-aqueous solvent media. The conventional thermally activated free radical initiators of the azo, peroxy, hydroperoxy, peroxyester, diacylperoxy type, and the like, may be employed. It is often preferable to run the dispersion polymerization to a lower solids level than desired in the final non aqueous dispersion product to avoid agglomeration and/or grit formation. The desired solids level of the non-aqueous dispersion product can be achieved by subsequent concentration by removal of the dispersion medium, as by distillation. If distillation is utilized to increase the solids level to a desirable solids level, it is preferable to conduct the distillation at reduced pressure to avoid overheating the non-aqueous dispersion. In addition this technique is also useful to reduce the level of residual monomer for environmental or health reasons.

The dispersion polymerization procedure may be conducted by reacting more than one monomer or monomer mixture of differing compositions for the insoluble polymer by adding the different monomers or monomer mixture composition in a sequential manner. If the insoluble polymer is prepared from a major amount of butylacrylate or ethylacrylate the insoluble polymer will have a relatively low glass transition temperature which will result in increased coating flexibility but longer drying speeds than if the insoluble polymer is formed from a major amount of more polar, higher Tg monomers, such as for example acrylonitrile or methylmethacrylate. These monomers will form polymers having a higher Tgc and the coating will have faster drying speed, but lower flexibility.

Accordingly by feeding the different monomers or monomer mixture compositions sequentially at different orders of addition it is possible to provide different overall Insoluble polymer structures and compositions for the non-aqueous dispersions which exhibit an improved balance of flexibility and drying speed in the modified alkyd-containing coatings.

The dispersion polymerization process for preparing the insoluble polymer non-aqueous dispersion is preferably conducted in the presence of the soluble polymer.

It is also possible to prepare the non-aqueous dispersion of this invention by other techniques such as for example by preparing the polymeric composition in a medium in which both polymers are soluble and subsequently creating a dispersion by the addition of a medium in which only one of the polymers is soluble or by substituting the original medium with another solvent such that only one of the polymers is soluble in that mixture. Another technique which could be used involves emulsion polymerization of the insoluble polymer and the creation of a non-aqueous dispersion containing that polymer by the addition of a soluble polymer and a non-aqueous medium with the removal of the water before or after addition of the soluble polymer and/or non-aqueous solvent.

Additives typically used in alkyd coating formulations such as for example plasticizers, driers, pigments, fillers and other solution polymers or alkyds could be added to the non-aqueous dispersion of the invention at concentrations equal to those typically used in coating formulations.

The weight ratio of the soluble polymer to the insoluble polymer (based on total polymer solids) in the non-aqueous dispersion is an important variable of the invention. At weight ratios of soluble polymer to insoluble polymer less than about 10 to 90 drying speed enhancement is diminished and the non aqueous dispersion process is also less preferred due to other preparation problems such as grit formation. At weight ratios of soluble polymer to insoluble polymer greater than about 60 to 40 the application viscosity of the alkyd resin containing formulations containing the non-aqueous dispersion compositions becomes too high and coating embrittlement becomes a problem.

The amount of non-aqueous dispersion admixed with an alkyd-containing coating formulation is a function of the properties of the alkyd formulation desired to be modified. Drying speed improvement increases with increasing amounts of the non-aqueous dispersion admixed with the alkyd coating formulation. The weight ratio of the non-aqueous dispersion solids to alkyd in the admixture is typically in the range of from about 5/95 to about 80/20. The preferred weight ratio of non-aqueous dispersion solids to alkyd is typically in the range of from about 10/90 to about 50/50.

The following examples are intended to illustrate the preparation of the non aqueous dispersion compositions of the invention and their use in alkyd containing coating formulations. They are not intended and should not be construed, to limit the invention since other non-aqueous dispersion compositions of the invention, their preparation and use to modify alkyd compositions are clear to those of ordinary skill in the art from the above description of the invention.

EXAMPLE 1: Preparation of Soluble Polymer

General Procedure

An initial charge of hydrocarbon liquid solvent, 35.02 grams of Varsol® Number 1 from Exxon Chemical Co., was added to a four neck round bottom flask equipped with a Friedrich's condenser, mechanical stirrer, immersion thermometer and inlets for nitrogen, monomer feed, chain transfer agent (if used) and initiator. The flask was then purged with nitrogen and maintained under a positive pressure of nitrogen. The flask was heated to 100° C. and the monomer feed, polymerization initiator system, and chain transfer agent system were then begun to be added to the flask at the same time. The monomer feed contained 149.98 grams of Varsol #1 Solvent, 45.00 grams of isodecylmethacrylate (IDMA), 60.00 grams of isobornyl methacrylate (IBOMA), 177.00 grams of isobutyl methacrylate (IBMA), 9.00 grams of allyl methacrylate (ALMA) and 9.00 grams of t-butylaminoethyl methacrylate (t-BAEMA). The polymerization initiator system employed contained 2.25 grams of an azo initiator (VAZO®-67 from EI DuPont de Nemours, Inc.), 6.00 grams of the Varsol solvent and 4.00 grams of ethyl acetate, constituting a concentration of 0.75 wt. % initiator by weight of monomer. The chain transfer agent system contained 5.25 grams of n-octylmercaptan (n-om) in 10.00 grams of Varsol solvent for a concentration of 1.75 weight percent on monomers. The monomer feed was gradually added to the flask over 3 hours. The chain transfer agent system was added over 3.5 hours. The polymerization initiator system was added at a rate such that two-thirds of the system was added over three hours followed by tripling the addition rate of the remaining one third over the final one half hour. After all feeds were completed the flask was maintained at 100° C. for one half hour, followed by cooling to room temperature with stirring. The resulting soluble polymer had a Mn of 6560 and a Mw of 27,600 as determined by gel permeation chromatography using polymethylmethacrylate as the standard. The solids level of the soluble polymer was 58.6% by weight.

Soluble polymer samples 2–21 were prepared by following the same procedure. The monomer composition and type and concentration of chain transfer agent used, as well as the solids level, Mw and Mn of the soluble polymers so prepared are presented in the following Table I.

TABLE 1

SOLUBLE POLYMER SAMPLES

| SAM- | MONOMER COMPOSITION WT % | | | | | | CHAIN TRANSFER AGENT | | SOLUBLE POLYMER | | |
|---|---|---|---|---|---|---|---|---|---|---|---|
| PLE | IDMA | IBMA | IBOMA | TBAEMA | ALMA | CMA | TYPE | % WT | WT % Solids | Mw | Mn |
| 2 | 34.9 | 49.1 | 10.0 | 3.0 | 3.0 | — | n-OM | 1.75 | 56.6 | 15,400 | 7,660 |
| 3 | 64.0 | 20.0 | 10.0 | 3.0 | 3.0 | — | n-OM | 1.75 | 55.6 | 19,500 | 8,600 |
| 4 | 15.0 | 59.0 | 20.0 | 3.0 | 3.0 | — | n-OM | 1.75 | 60.0 | 23,600 | 6,990 |
| 5 | — | 94.0 | — | 3.0 | 3.0 | — | n-OM | 1.75 | 61.1 | 27,100 | 7,030 |
| 6 | — | 74.0 | 20.0 | 3.0 | 3.0 | — | n-OM | 1.75 | 65.1 | 55,900 | 8,840 |
| 7 | 15.0 | 56.0 | 20.0 | 3.0 | — | 6.0 | n-OM | 0.50 | 59.3 | 44,000 | 15,400 |
| 8 | 15.0 | 56.0 | 20.0 | 3.0 | — | 6.0 | — | — | 63.8 | 120,000 | 41,600 |
| 9 | — | — | 94.0 | 3.0 | 3.0 | — | n-OM | 1.75 | 59.3 | 51,700 | 10,300 |
| 10 | — | 34.0 | 60.0 | 3.0 | 3.0 | — | n-OM | 1.75 | 60.0 | 34,000 | 9,290 |
| 11 | — | 34.0 | 60.0 | 3.0 | 3.0 | — | n-OM | 1.75 | 58.4 | 33,400 | 7,020 |
| 12 | — | 59.0 | 40.0 | 3.0 | 3.0 | — | n-OM | 1.75 | 57.5 | 25,600 | 6,790 |
| 13 | — | 34.0 | 60.0 | 3.0 | 3.0 | — | n-OM | 1.75 | 60.1 | 25,600 | 6,900 |
| 14 | — | 35.5 | 60.0 | 3.0 | 1.5 | — | n-OM | 0.88 | 60.1 | 50,600 | 14,100 |
| 15 | — | 31.0 | 60.0 | 3.0 | 6.0 | — | n-OM | 3.5 | 57.8 | 19,800 | 5,560 |
| 16 | — | 37.0 | 60.0 | 3.0 | 0.0 | 0.0 | n-OM | 1.75 | 59.7 | 18,800 | 6,050 |
| 17 | — | 36.0 | 60.0 | 3.0 | 1.0 | 0.0 | n-OM | 1.75 | 59.5 | 19,200 | 7,210 |
| 18 | — | 35.0 | 60.0 | 3.0 | 2.0 | 0.0 | n-OM | 1.75 | 61.4 | 24,300 | 7,490 |
| 19 | — | 32.5 | 60.0 | 3.0 | 4.5 | 0.0 | n-OM | 1.75 | 61.0 | 119,000 | 6,980 |
| 20 | — | 34.0 | 60.0 | 3.0 | 3.0 | 0.0 | n-OM | 3.5 | 57.7 | 10,300 | 3,480 |
| 21 | — | 34.0 | 60.0 | 3.0 | 3.0 | 0.0 | n-OM | 7.0 | 56.1 | 4,270 | 1,830 |

IDMA = isodecyl methacrylate
IBMA = isobutyl methacrylate
IBOMA = isobornyl methacrylate
ALMA = allyl methacrylate
TBAEMA = t-butylaminoethyl methacrylate
CMA = crotyl methacrylate EXAMPLE 2 Preparation of Other Soluble Polymers The procedure of Example 1 was utilized with the following changes in materials to prepare two additional soluble polymers (Samples 22 and 23).

Sample 22 was prepared using 44.42 grams of toluene as the initial flask charge solvent. The monomer feed was 149.98 grams toluene, 132.00 grams styrene; 60.00 grams IBOMA, 90.00 grams IBMA, 9.00 grams ALMA and 9.0 grams t-BAEMA. No chain transfer agent was used. The polymerization initiator system was 21.60 grams of Lupersol® 575 (7.20 weight percent), a peroxy initiator of the Lucidol division of Pennwalt Corp., in 20.00 grams of toluene. The soluble polymer product had a solids level of 56.2 weight percent, Mw of 19300 and a Mn of 6710 using polystyrene as the calibration standard.

Sample 23 was prepared by using 44.42 grams of an aromatic hydrocarbon Solvesso 100 from Exxon Chemical as the initial flask charge solvent. The monomer feed was 149.98 grams Solvesso 100, 192.00 grams paramethylstyrene, 60.00 grams IBOMA, 30.00 grams IBMA, 9.00 grams ALMA and 9.00 grams t-BAEMA. No chain transfer agent was used. The polymerization initiator system was 21.60 grams Lupersol 575 (7.20 weight percent) in 20.00 grams toluene. The soluble polymer product had a 56.3 weight percent level, a Mw of 20,700 and Mn of 7290 (polystyrene calibration).

EXAMPLE 3: Preparation of Non Aqueous

Dispersion Compositions

A portion of each of the soluble polymer in solvent samples of Example 1 (with some being used more than once) were used as the initial flask charge to prepare samples of the non aqueous dispersion of the invention according to the following procedure. The table which follows (Table 2) summarizes the specific monomer composition of the insoluble polymer, weight percent of insoluble polymer to soluble polymer in the final non aqueous dispersion product, and percent solids by weight of the product formed according to the procedure.

General Procedure

A four neck round bottom flask as described in Example 1 was used. The initial flask charge constituted the soluble polymer product prepared according to Example 1 in Varsol Solvent. The flask was purged with nitrogen, maintained under positive nitrogen pressure and heated to 90° C. as in example 1. The seed charge was then added. The seed charge contained a portion (one third by weight) of the monomers used to prepare the insoluble polymer with a fraction of free radical polymerization initiator. This fraction constituted 16.7 percent by weight of the total amount of initiator used for the polymerization of the insoluble polymer. The total concentration of initiator used was 0.78 percent by weight of monomer and soluble polymers.

After addition of the seed charge the flask temperature dropped and was then raised back to 90° C., the monomer feed and initiator feed were then gradually added. This addition was conducted over a three hour period. Upon completion of the monomer feed and initiator feed, the chase feed constituting the remaining fifty percent of initiator in solvent was added over the course of one hour. The reaction was maintained at 90° C. for one additional hour. The Friedrich's condenser was then replaced with a distillation head and solvent was then removed under vacuum at 150° C. until the desired solids content of the final product was achieved.

The following lists specific compositions of each charge used to prepare Sample 24.

| Initial Flask Charge: | |
|---|---|
| Sample 1 | 136.52 grams |
| Varsol #1 | 116.50 grams |
| Seed Charge | |
| Lupersol 11 | 0.26 grams |
| Methyl methacrylate (MMA) | 10.6 grams |
| Ethyl acrylate (EA) | 17.4 grams |
| Acrylonitrile (AN) | 12.0 grams |
| Monomer Feed | |
| Varsol #1 | 53.34 grams |
| MMA | 21.21 grams |
| EA | 34.8 grams |
| AN | 24.0 grams |
| Initiator Feed | |
| Lupersol 11 | 0.52 grams |
| Varsol #1 | 10.00 grams |
| Chase Feed | |
| Lupersol 11 | 0.78 grams |

The final non-aqueous product (sample 24) contained a ratio of 40 percent by weight soluble polymer (sample 1) to 60 percent by weight insoluble polymer. The overall monomer composition of the insoluble polymer fraction was 26.5% MMA, 43.5% EA and 30.0% AN. The final solids content of the distilled non aqueous dispersion product was 59.9% by weight. The final product had a Brookfield viscosity (as measured using a number 2 spindle at 60 rpm) of 340 centipoises. The volume averaged particle size of the polymer in the final product in n-hexane was 438 nanometers as measured by a nanosizer.

Table 2 presents the results of the non-aqueous dispersion samples:

TABLE 2

Non Aqueous Dispersion Products.

| Non-Aqueous Dispersion Sample | Soluble Polymer Sample | Monomer Composition (wt %) of Insoluble Polymer | | | % Soluble Polymer Fraction | % Solids Non-Aqueous Dispersion |
|---|---|---|---|---|---|---|
| | | MMA | EA | AN | | |
| 24 | 2 | 26.5 | 43.5 | 30.0 | 40 | 58.0 |
| 25 | 3 | 26.5 | 43.5 | 30.0 | 20 | 66.4 |
| 26 | 4 | 70.0 | — | 30.0 | 40 | 58.9 |
| 27 | 5 | 26.5 | 43.5 | 30.0 | 40 | 56.9 |
| 28 | 6 | 70.0 | — | 30.0 | 40 | 59.5 |
| 29 | 7 | 26.5 | 43.5 | 30.0 | 40 | 59.9 |
| 30 | 8 | 26.5 | 43.5 | 30.0 | 40 | 60.6 |
| 31 | 9 | 70.0 | — | 30.0 | 40 | 59.7 |
| 32 | 10 | 70.0 | — | 30.0 | 40 | 60.6 |
| 33 | 11 | 70.0 | — | 30.0 | 30 | 59.0 |
| 34 | 11 | 70.0 | — | 30.0 | 20 | 60.4 |
| 35 | 12 | 70.0 | — | 30.0 | 40 | 58.1 |
| 36 | 13 | 70.0 | — | 30.0 | 10 | 59.1 |
| 37 | 13 | 70.0 | — | 30.0 | 50 | 59.0 |
| 38 | 13 | 70.0 | — | 30.0 | 60 | 60.2 |
| 39 | 14 | 70.0 | — | 30.0 | 40 | 60.0 |
| 40 | 15 | 70.0 | — | 30.0 | 40 | 59.7 |

TABLE 2-continued

Non Aqueous Dispersion Products.

| Non-Aqueous Dispersion Sample | Soluble Polymer Sample | Monomer Composition (wt %) of Insoluble Polymer | | | % Soluble Polymer Fraction | % Solids Non-Aqueous Dispersion |
|---|---|---|---|---|---|---|
| | | MMA | EA | AN | | |
| 41 | 16 | 70.0 | — | 30.0 | 40 | 60.3 |
| 42 | 17 | 70.0 | — | 30.0 | 40 | 60.1 |
| 43 | 18 | 70.0 | — | 30.0 | 40 | 59.6 |
| 44 | 19 | 70.0 | — | 30.0 | 40 | 59.4 |
| 45 | 20 | 70.0 | — | 30.0 | 40 | 60.3 |
| 46 | 21 | 70.0 | — | 30.0 | 40 | 59.5 |
| 47 | 22 | 70.0 | — | 30.0 | 40 | 59.4 |

EXAMPLE 4: Preparation of Non-Aqueous Dispersion Product

A non-aqueous dispersion product was prepared the procedure set forth in Example 3. The ingredients used were as follows:

| SAMPLE 48: | | |
|---|---|---|
| Flask Charge | 142.35 grams | Sample 22 |
| | 51.56 grams | Varsol |
| | 51.56 grams | Solvesso 100 |
| Seed Charge | 0.26 grams | Lupersol 11 |
| | 28.0 grams | MMA |
| | 12.0 grams | AN |
| Monomer Feed | 26.67 grams | Varsol |
| | 26.67 grams | Solvesso 100 |
| | 56.0 grams | MMA |
| | 24.0 grams | AN |
| Initiator Feed | 0.52 grams | Lupersol 11 |
| | 6.67 grams | Varsol |
| | 6.67 grams | Solvesso 100 |
| Chase Feed | 0.78 grams | Lupersol 11 |
| | 7.11 grams | Varsol |
| | 7.11 grams | Solvesso 100 |

The final product contained a ratio of 40.0 wt % soluble polymer to 60.0 wt % insoluble polymer (70% MMA/30% AN); with a solids content of 59.0% and a viscosity of 300 cps.

EXAMPLE 5: Preparation of Non-Aqueous Dispersion Product by Sequential Addition Process Into a four neck round bottom flask, as described in Example 1, was placed the following flask charge: 133.33 grams of soluble polymer (sample 13) and 108.80 grams of Varsol solvent. The flask was purged with nitrogen, maintained at positive nitrogen pressure and heated to 90° C. One-half of the following Monomer Feed I was then added: 0.12 grams Lupersol 11, 6.4 grams MMA, 10.4 grams EA, 7.2 grams AN, resulting in a few degrees drop in temperature. When the temperature had been raised back to 90° C. the remaining 50% of Monomer Feed I was added gradually over 45 minutes. The flask was maintained at 90° C. for 15 minutes. Monomer Feed II and initiator were fed over two hours. Monomer Feed II constituted 64.0 grams varsol, 52.8 grams EA, 28.8 grams butylacrylate (BA) and 14.4 grams AN. The initiator constituted 0.48 grams Lupersol 11 and 10.00 grams Varsol. Immediately upon the completion of the addition of Monomer Feed II and initiator, a chase feed constituting 0.78 grams Lupersol 11 and 10.00 grams of Varsol 1 were added gradually over 1 hour. The reaction was held at 90° C. for one additional hour. The Friedrich's condenser was then replaced by a distillation head and solvent was removed under vacuum until final solids content (150° C., 1.5 hours) was 61.0%. The overall monomer composition of the insoluble polymer was 20% (26.5% MMA/43.5% EA/30% AN) and 80% (55% EA/30% BA/0.5% AN). The final product had a Brookfield viscosity (Spindle #2, 60 rpm) of 4,400 cps. This product shall be referred to as Sample 49.

EXAMPLE 6: Preparation of Non-Aqueous Dispersion by Sequential Addition

Another non-aqueous dispersion product was prepared by a sequential feed process following the procedure of example 5 with the following changes. The initial flask charge constituted 88.9 grams of soluble polymer sample 13 in 108.8 grams Varsol. After the flask was heated to 90° C. the entire seed charge constituting 27.2 grams EA, 4.7 grams AN and 0.18 grams Lupersol 11 was added. The temperature was brought back to 90° C. and monomer Feed I and Initiator Feed were begun. Monomer Feed I constituted 51.2 grams Varsol, 54.4 grams EA and 9.7 grams AN. This Monomer Feed I was gradually added over 2 hours. Initiator feed constituted 0.48 grams Lupersol 11 and 10.0 grams Varsol. The initiator feed was gradually added over 3 hours. Fifteen minutes after the completion of Monomer Feed I addition, Monomer Feed II was added in one portion. Monomer Feed II constituted 4.3 grams Varsol, 44.4 grams soluble polymer Sample 13, 2.1 grams MMA, 3.5 grams EA, 2.4 grams AN and 0.09 grams Lupersol 11. After the temperature again was brought back to 90° C. Monomer Feed III was gradually added over 45 minutes. Monomer Feed III constituted 4.3 grams MMA, 6.9 grams EA, 4.8 grams AN and 8.5 grams Varsol. Immediately upon completion of addition of initiator feed and Monomer Feed III, the chase feed constituting 0.78 grams Lupersol 11 and 10.0 grams Varsol was added over 1 hour. The reaction was maintained at 90° C. for one additional hour. The Friedrich's condenser was then replaced by the distillation head, solvent was removed under vaccum until final solids (150° C., 1.5 hours) was 60.2%. Final product (Sample 50) formed from an insoluble polymer composition of 180% (85% EA, 15% AN) 20% (26.5% MMA, 43.5% EA, 30% AN) and weight of soluble polymer (40%) to insoluble polymer (60%), had a viscosity of 1,390 cps (Brookfield #2 spindle, 60 rpm) and a volume average particle size (nanosizer) of 253 nanometers.

EXAMPLE 7: Preparation Non-Aqueous Dispersion Modified Alkyd Paints and Measurements Two types of alkyd paints containing non-aqueous dispersion products of the prior examples were prepared. One was a green paint and the other was a yellow paint.

In preparing the green pigmented paints a pigment grind (ball mill grind) was made using 100 parts by weight chrome yellow, 21.45 parts Phthalocyanin Green (Monastral Green B from E. I. DuPont), 28.5 parts titanium dioxide ($TiO_2$) (DuPont R-902); 352.94 parts alkyd resin Aroplaz 6440 (85% in butylacetate from Spencer Kellog Products) and 189.37 parts butyl acetate. The pigment grind was let down with the alkyd and non-aqueous dispersion product and drying agent to provide green paints having the following formulation constant: Pigment/Binder (alkyd plus non-aqueous dispersion product) =15/85, 55 wt % solids (let down solvent was butyl acetate or xylene); and drying agent was mixture of 0.06% cobalt, 0.35% zirconium, and 0.22% Exkin #2 based on binder.

In preparing the yellow pigmented paints, a pigment grind (ball mill grind) was made using 199.5 parts (by weight) of yellow iron oxide (Pfizer Pigments, Inc.); 150.5 parts $TiO_2$ (DuPont R-902), 233.06 parts Aroplaz 6440 and 119.63 parts xylene. The pigment grind was let down with the alkyd resin, non-aqueous dispersion product and drying agent to give a yellow paint with Pigment/Binder ratio of 30/70, 60% (wt) solids. The drying agent was a combination of 0.08% cobalt, 0.35% zirconium and 0.22% Exkin #2.

Paint films were then cast on steel panels (Bonderite 1000 from Hooker Chemical and Plastics Corp.) from each of the following alkyd paints so prepared. The drying time for each film was measured using ASTM test method D 1640-69 section 5.3.3 except that either 100 grams or 500 grams weight were used instead of suggested 300 gram weight to see the drying effect. Drying times were measured against three controls:

Control 1: was a paint containing no non-aqueous dispersion polymer of the invention and containing 100% Aroplaz 6440 alkyd.

Control 2: was a paint containing 20% by weight of a solution polymer, (Rohm and Haas Company ACRYLOID® (B- 67) with 80% Aroplaz 6440.

Control 3: was a paint containing 25% by weight of a low molecular weight solution polymer (Mn about 2,500, Tgc about 90° C.) and 75% Aroplaz 6440.

Comparative Control

An alkyd resin paint formulation containing an alkyd modified polymer prepared similarly in accordance with the prior art was also made and tested for comparative purposes.

This product was prepared as follows: In a four neck, round bottom flask, as described in example 1, was added a flask charge containing 408.0 grams of Cargill 5070 (Cargill, Inc.) a long soya oil alkyd containing 70% solids by weight, 300.2 grams heptane and 578.0 grams Varsol. The flask was purged with nitrogen, maintained under a positive nitrogen pressure, and heated to 90° C. The seed charge constituting 0.6 grams benzoyl peroxide, 0.4 grams lauroyl peroxide, 103.2 grams MMA, 174.0 grams EA, 120.0 grams AN and 2.8 grams acrylic acid (AA) was added in one portion resulting in a few degrees drop in temperature. After the temperature reached 90° C. again, the monomer feed and initiator feed were begun to be added gradually over 3 hours. The monomer feed constituted 450.0 grams Varsol, 206.4 grams MMA, 348.0 grams EA, 240.0 grams AN and 5.6 grams AA. The initiator feed constituted 1.0 grams benxoyl peroxide, 0.6 grams lauroyl peroxide, 8.0 grams ethylacetate and 24.0 grams Varsol. Immediately upon completion of addition of these feeds, the chase feed constituting 5.6 grams lauroyl peroxide, 8.0 grams Solvesso 100 and 24.0 grams Varsol was added over 1 hour. The reaction was maintained at 90° C. for one additional hour. The Fredrich condenser was replaced with a distillation head, the solvent was removed under vaccum. The final product had a solids content (150° C., 1.5 hours) of 52.7%, a Brookfield viscosity (#2 spindle, 60 rpm) of 2,050 cps and volume average particle size of 340 nanometers. The ratio of Cargill alkyd to non-aqueous dispersion polymer was 19.2/81.8%. This product was used to formulate paints according to the above procedure and the results are presented in Table III as a comparative experiment.

The film properties for all tested paints were measured after a 2 weeks air dry at 50% humidity and 75° F. temperature. Film thickness was measured using General Electric Co. gauge type Do-41 and were found to remain constant at 1.50±0.05 mil. Impact resistance of the films was measured on the films prepared on the above panels by a falling weight test following ASTM G 14-72 but using the panel instead of a pipe. All drying times were run side by side with a control #2 and normalized so that the drying time for control #2 was 3.8 and 6.0 hours for 100g and 500 gram samples. Therefore, the tack-free times for samples reported below are relative to a constant control #2 drying time which makes comparison between all samples more accurate. Tgc data were calculated using the Fox equation.

TABLE 3

Effect of Soluble Polymer Tgc in Non-Aqueous Dispersion Product (NAD/Alkyd)

Formulation on Paint Drying (Green Paint) and Impact Resistance

| Sample | NAD Sample No. | SOLUBLE POLYMER Sample No. | Tgc | Conc. wt % | NAD/ALKYD Wt. Ratio | DRYING TIME HRS. 100 gms | 500 gms | IMPACT (in-lb) | Quality[1] |
|---|---|---|---|---|---|---|---|---|---|
| Control 1 | | | | | 0/100 | 8–24 | >24 | 95 | E |
| Control 2 | | | | | 20/80 | 3.8 | 6.0 | 13 | A |
| Control 3 | | | | | 25/75 | 3.8 | 6.0 | 9 | U |
| Comparative | | Cargill | 5070 | 20 | 40/60 | 6.2 | 7.7 | 90 | E |
| 38 | 31 | 9 | 157 | 40 | 25/75 | 3.5 | 5.3 | 13 | A |
| 39 | 32 | 10 | 110 | 40 | 25/75 | 3.8 | 5.8 | 13 | A |
| 40 | 47 | 23 | 106 | 40 | 25/75 | 3.9 | 6.0 | 15 | A |
| 41 | 48 | 22 | 89 | 40 | 25/75 | 4.8 | 6.6 | 15 | A |
| 42 | 35 | 12 | 86 | 40 | 25/75 | 4.3 | 6.2 | 14 | A |
| 43 | 35 | 12 | 86 | 40 | 30/70 | 3.8 | 5.1 | 13 | A |
| 44 | 28 | 6 | 66 | 40 | 25/75 | 4.5 | 7.0 | 15 | A |

TABLE 3-continued

Effect of Soluble Polymer Tgc in Non-Aqueous Dispersion Product (NAD/Alkyd)

Formulation on Paint Drying (Green Paint) and Impact Resistance

| Sample | NAD Sample No. | SOLUBLE POLYMER | | | NAD/ALKYD Wt. Ratio | DRYING TIME HRS. | | IMPACT | |
| | | Sample No. | Tgc | Conc. wt % | | 100 gms | 500 gms | (in-lb) | Quality[1] |
|---|---|---|---|---|---|---|---|---|---|
| 45 | 28 | 6 | 66 | 40 | 30/70 | 4.3 | 5.9 | 14 | A |
| 46 | 27 | 5 | 47 | 40 | 25/75 | 5.0 | 7.5 | 15 | A |
| 47 | 27 | 5 | 47 | 40 | 30/70 | 5.0 | 7.0 | 15 | A |
| 48 | 24 | 2 | 16 | 40 | 25/75 | 7.6 | 8–24 | 18 | A |
| 49 | 25 | 3 | −10 | 40 | 40/60 | 6.1 | 8–24 | 18 | A |
| 50 | 49 | 13 | 110 | 40 | 25/75 | 4.5 | 7.0 | 35 | E |
| 51 | 50 | 13 | 110 | 40 | 25/75 | 4.2 | 6.3 | 30 | A |

[a)]identify preparation of NAD and soluble polymer
[1)]Film Quality: Impact resistance 0–10 (U) unacceptable, brittle; 10–30 (A) acceptable; >30 (E) excellent.

TABLE 4

Effect of Concentration of Soluble Polymr (Yellow Paint)

| NAD Sample No. | Conc. of Soluble Polymer Wt. % | NAD/ALKYD Wt. Ratio | ALKYD FORM. ICI Viscosity (CPS) | DRYING TIME HRS. | | IMPACT (in/lb) | |
| | | | | 100 g | 500 g | | |
|---|---|---|---|---|---|---|---|
| 36 | 10 | 25/75 | 95 | 5.75 | >8.5 | 16 | A |
| 34 | 20 | 25/75 | 115 | 4.75 | >8.5 | 17 | A |
| 33 | 30 | 25/75 | 125 | 4.25 | 8.25 | 14 | A |
| 32 | 40 | 25/75 | 155 | 4.25 | 7.0 | 14 | A |
| 50 | 40 | 25/75 | 250 | 5.25 | 8.5 | 35 | E |
| 51 | 40 | 25/75 | 230 | 5.00 | 7.9 | 30 | E |
| 37 | 50 | 25/75 | 170 | 4.25 | 6.25 | 13 | A |
| 38 | 60 | 25/75 | 185 | 4.00 | 5.75 | 12 | A |
| Control 1 | 0 | 0/100 | 120 | 8–24 | >24 | 95 | E |
| Control 2 | | 20/80 | 480 | 4.75 | 7.5 | 13 | A |

TABLE 5

Effect of Soluble Polymer Molecular Weight (Yellow Paint)

| NAD Sample | ALKYD FORMULATION | | DRYING TIME HRS. | |
| | NAD/ALKYD Ratio | ICI Viscosity CPS | 100 g | 500 g |
|---|---|---|---|---|
| Control 2 | 20/80 | 480 | 5.0 | 6.8 |
| 39 | 25/75 | 150 | 4.5 | 6.3 |
| 32 | 25/75 | 150 | 4.75 | 6.5 |
| 40 | 25/75 | 115 | 5.0 | 6.8 |
| Control 2 | 20/80 | 350 | 4.5 | 7.0 |
| 30 | 40/60 | 410 | 2.75 | 5.0 |
| 29 | 40/60 | 190 | 2.75 | 4.5 |
| 26 | 40/60 | 110 | 3.0 | 4.5 |
| Control 2 | 20/80 | 470 | 4.5 | 6.3 |
| 41 | 25/75 | 170 | 4.75 | 7.0 |
| 42 | 25/75 | 160 | 4.75 | 7.0 |
| 43 | 25/75 | 160 | 4.60 | 6.3 |
| 44 | 25/75 | 210 | 4.60 | 7.0 |
| 45 | 25/75 | 140 | 4.6 | 7.0 |
| 46 | 25/75 | 130 | 6.1 | 7.1 |

EXAMPLE 8: Pigment Settling Stability

The pigment settling stability of the alkyd paint formulations of example 7 containing the non-aqueous dispersion of the invention were evaluated in comparison with Control 1 and Control 2. A two ounce vial containing the alkyd formulations were stored at room temperature. The paints containing Control 1 and those containing Control 2 phase separated into two phases within 24 hours. Those paint formulations containing the NAD products remained one phase after 2 months storage.

This demonstrates that the non-aqueous dispersion of the invention provides improved pigment settling stability for alkyd-containing pigmented coatings over prior modifiers.

What is claimed is:

1. A method for reducing the drying time of a coating formed from an alkyd-containing formulation comprising:

admixing with said alkyd-containing formulation at least an effective amount of a non-aqueous, alkyd-free polymeric dispersion comprising from about 10 to about 60 weight percent of a first polymer, said first polymer, consisting essentially of an addition-polymerized polymer formed from at least one monoethylenically-unsaturated monomer, and from about 90 to about 40 weight percent of a second polymer, said second polymer consisting essentially of an addition-polymerized polymer formed from at least one monoethylenically-unsaturated monomer, where said first polymer is attached to or adsorbed onto said second polymer and where said first polymer is soluble in the non-aqueous medium, has a number average molecular weight in the range of from about 2000 to about 40,000, and has a calculated glass transition temperature greater than −10° C., and where said second polymer is insoluble in said non-aqueous medium.

2. The method of claim 1 wherein said first polymer is formed from one or more monomers selected from the group consisting of styrene, styrene isomers, alkylesters of methacrylic acid, alkyl esters of acrylic acid, and vinyl-containing monomers.

3. The method of claim 1 wherein said second polymer is formed from one or more monomers selected from the group consisting of acrylic acid, methacrylic acid, $C_1$–$C_4$ alkylesters of (meth)acrylic acid, monoesters of glycols, acrylamide, methacrylamide, (meth)acrylonitrile, vinylacetate, vinyl chloride, vinylidene chloride and derivatives of unsaturated acids.

4. The method of claim 1 wherein said second polymer comprises a copolymer formed from acrylonitrile.

5. The method of claim 1 wherein said second polymer is a copolymer formed by dispersion polymerizing at least two monomers in said nonaqueous medium by sequentially feeding the monomers to said polymerization medium.

* * * * *